Feb. 28, 1956     I. L. WILCOX     2,736,065
METHOD OF FORMING LINERS FOR PAPER CONTAINERS
Filed Aug. 31, 1953     2 Sheets-Sheet 2

INVENTOR
Isaac L. Wilcox
BY D. Emmett Thompson
Attorney

United States Patent Office 2,736,065
Patented Feb. 28, 1956

2,736,065

METHOD OF FORMING LINERS FOR PAPER CONTAINERS

Isaac L. Wilcox, Fulton, N. Y., assignor to Oswego Falls Corporation, Fulton, N. Y., a corporation of New York Application August 31, 1953, Serial No. 377,576

2 Claims. (Cl. 18—56)

This invention has as an object a method of economically forming cup-shaped members from thin sheet plastic material, whereby the cup-shaped members are of substantially uniform thickness. Such cup-shaped members are particularly advantageous for lining paper containers to render the same impervious to liquids, and to render the containers suitable for packaging products which cannot be put directly into paper containers, or into containers formed of paper coated with various substances.

At the present time, various cup-shaped members are formed from plastic material. These members include containers and covers for containers, the members being formed by the injection molding process, or by mechanically drawing the material into a mold. These members have substantial thickness. This process, while slow and costly, is practical for making cup-shaped members of the type referred to for repetitive use. However, for obvious reasons, it is entirely prohibitive in the formation of such members for use as liners for single service paper containers.

By my method, I am able to produce liners from exceedingly thin sheet plastic material having a thickness not exceeding a few thousandths of an inch and at the same time maintaining the thickness of the liner uniform.

Apparatus suitable for carrying out my method is depicted in the accompanying drawings in which Figure 1 is a vertical sectional view of a mold support and plunger.

Figure 1:
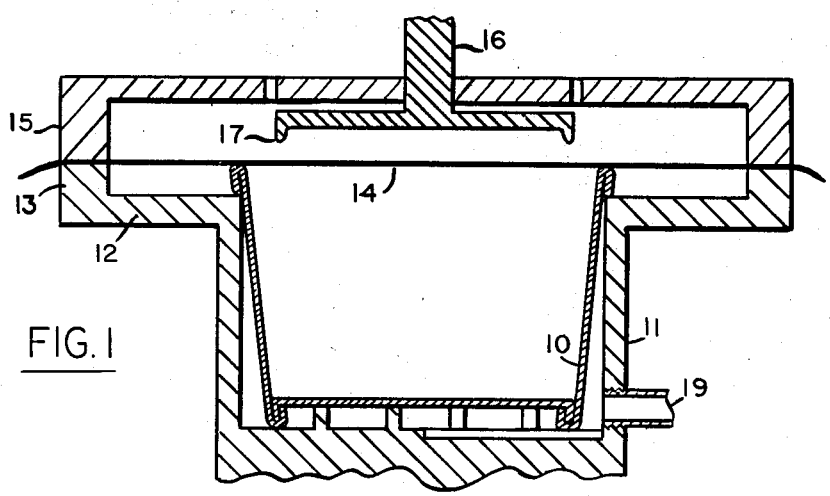

The method consists generally in placing a sheet of heated plastic material over the open end of a mold formed of material having a porosity sufficient to permit the free passage of air therethrough. The heated sheet is then partially drawn into the porous mold by the application of mechanical force and thereupon a differential in fluid pressure is established between that on the upper side of the sheet and that on the lower side of the sheet. The fluid pressure established on the upper side of the sheet is in excess of the pressure against the under side of the sheet, whereby the sheet is completely drawn into engagement with the entire inner surface of the mold. In forming these cup-shaped members for liners for paper containers, the container itself may, and preferably does, constitute the porous mold, the paper container having sufficient porosity to permit the free passage of air outwardly from within the container during the final drawing operation.

The mold 10 has an uninterrupted inner surface but is formed of porous material such as sintered metal or, as above stated, if the formed member is to serve as a liner for paper containers, the paper container may serve as the mold 10 and thus avoid further handling of the formed member. In either event, the mold 10 is positioned in a suitable support 11 formed with a concavity dimensioned to receive the mold. The support is formed with an annular flange portion 12 encircling its upper end. If the mold is other than the paper container, the upper edge of the mold may be positioned flush with the upper surface of the flange 12. However, if the paper container is employed in the formation of the cup-shaped member, the concavity of the support is dimensioned to cause the upper end of the container to project somewhat above the flange 12, as shown in the drawings. With this arrangement, the flange 12 is formed with an annular portion 13, the upper surface of which is arranged in the plane of the top edge of the container and being spaced concentrically outward therefrom. The heated sheet 14 of the plastic material is positioned on the annular portion 13 of the support and is clamped thereto by an annular member 15.

Figure 2:
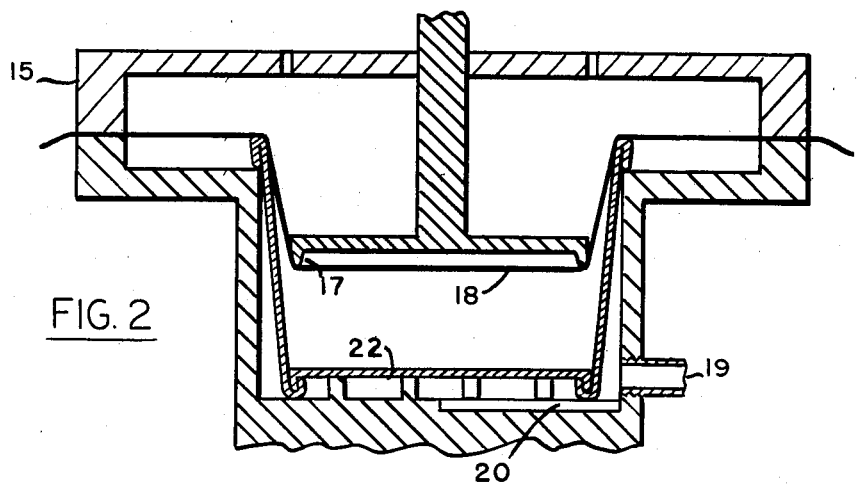
Figure 2 is a view, similar to Figure 1, showing the plunger moved downwardly part way into the mold.

With the heated sheet thus positioned over the open end of the mold 10, the central discoidal portion of the sheet is partially drawn into the mold by downward movement of a plunger 16, as indicated in Figure 2. This partial drawing of the sheet into the mold by mechanical pressure effected by the downward movement of the plunger 16 takes place substantially instantaneously and thereupon, the sheet is completely drawn into the container by establishing a higher fluid pressure on the upper side of the sheet than that existing against the lower or under surface of the sheet.

During this mechanical drawing of the sheet, the stretching of the heated plastic material is confined mainly to that annular portion of the sheet between the plunger 16 and the clamp member 15. Preferably, the plunger 16 is formed with a depending circular flange 17 effective to engage only an annular area in the central portion of the sheet. This engagement by the flange 17 of the plunger effects some cooling of that annular area of the sheet and thereby tends to reduce the stretching effect in that area. Due to the fact that the sheet is drawn about the flange 17, there is less radial force applied to the central discoidal portion of the sheet within the flange 17 than is applied to that portion of the sheet between the flange 17 and the clamp ring 15. Accordingly, the initial drawing of the sheet in this manner effects a substantial stretch in the sheet between the flange 17 and the ring 15 but substantially little stretching in the discoidal portion 18 of the sheet.

Figure 3:
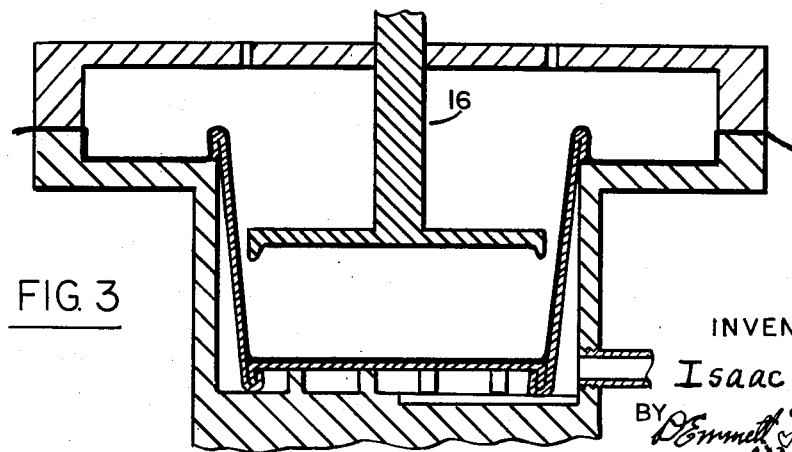
Figure 3 is a view, similar to Figures 1 and 2, illustrating the completely formed member.
Figure 4:
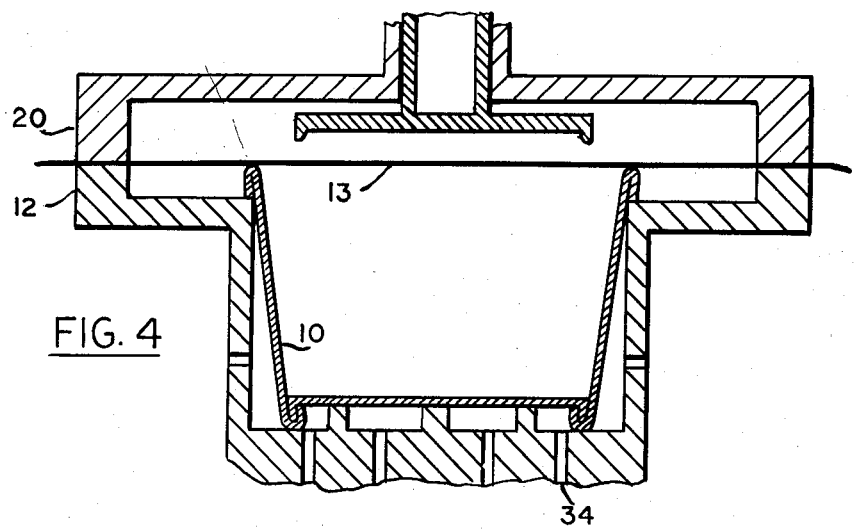
Figure 4 is a view, similar to Figure 3, of a modified form of apparatus.
Figure 5:
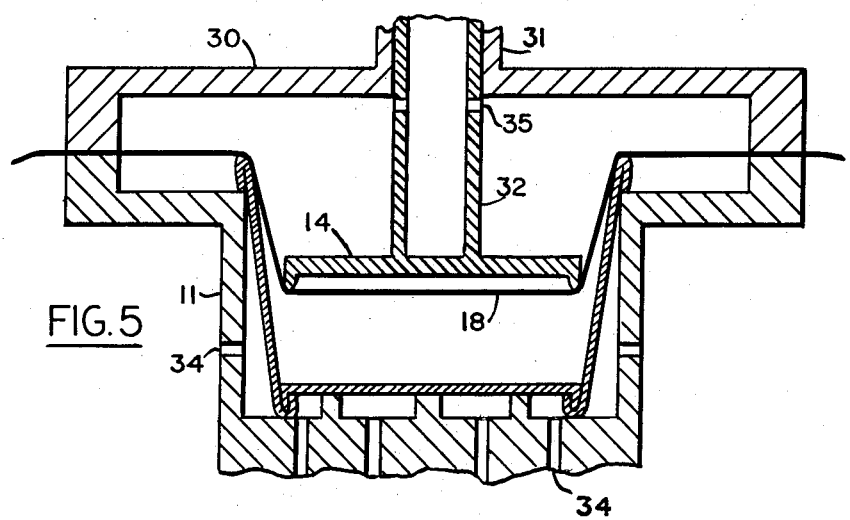
Figure 5 is a view, similar to Figure 4, showing the plunger moved downwardly part way into the mold.
Figure 6:
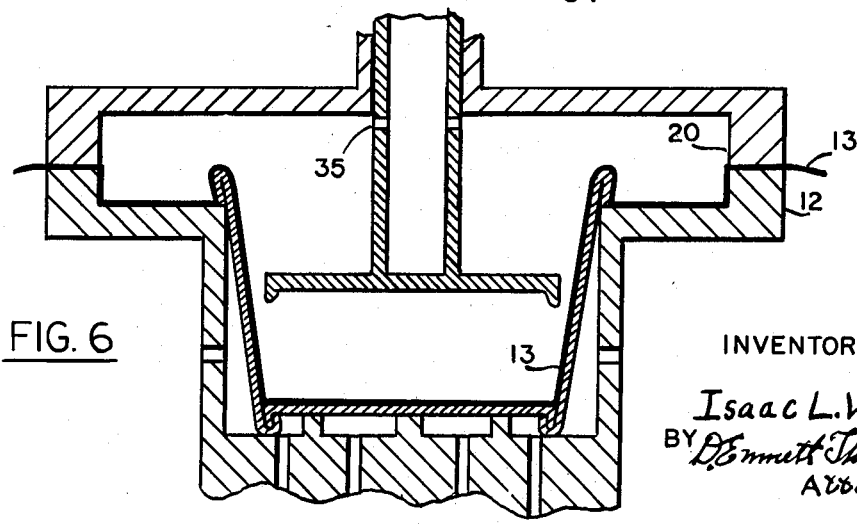
Figure 6 is a view, similar to Figures 4 and 5 illustrating the completely formed member.

In Figures 1, 2 and 3, the support 11 is formed with a passage into which is mounted a conduit 19 which, when the plunger reaches the bottom of its stroke, is connected to a source of vacuum. The bottom wall of the support 11 is formed with one or more diametrically extending grooves 20. Upon the application of vacuum to the conduit 19, the air within the mold 10 is drawn through the side wall thereof and through the bottom 22 into the grooves 20 which communicate with the space between the side walls of the mold and support and which is extracted through the conduit 19. This effectively reduces the pressure on the under side of the sheet, whereupon the higher atmospheric pressure on the upper surface of the sheet will force the sheet downwardly and against the entire inner surface of the mold. During this step in the process, a stretching action will occur throughout the entire area of the sheet within the mold. I have found that when the sheet is drawn directly and completely into the mold by the establishment of the differential in pressure between the upper and under sides of the sheet, that the bottom of the formed member is exceedingly thin. This results from the fact that the greatest stretching of the sheet takes place in the center of the sheet. Accordingly, by effecting the initial drawing of the sheet mechanically with the plunger as stated, I effect an initial stretching of that portion of the sheet between the plunger and the clamp ring 15. As the sheet is moved downwardly into the mold by the plunger, it is drawn into engagement with the upper edge of the mold and, during the remaining downward movement of the plunger, the stretching of the sheet is effected in that portion of the sheet between the plunger 18 and the top edge of the mold. Accordingly, with this portion of the sheet initially stretched, the establishment of the differential fluid pressure will result in further stretching of this portion of the sheet. However, it will also result in stretching the central discoidal portion to a greater degree, whereby the completely formed member has a substantially uniform thickness in both the side wall and the bottom portions. It will be understood that this thickness of the formed member will be somewhat less than the original thickness of the sheet inasmuch as the member is essentially formed by the stretching of the heated plastic material.

Upon the application of vacuum to the mold, the sheet will be immediately drawn snugly over the top edge of the mold and against the exterior of the top portion of the mold extending upwardly from the flange 12 of the support.

In this positioning arrangement of the mold, the mold consists of a paper container as previously stated and the purpose of having the upper portion of the container extend upwardly beyond the flange 12 is to effect this drawing of the material downwardly about the upper surface of the container. After the formation of the liner with this arrangement, the peripheral portion of the sheet is trimmed off adjacent to the container, this being readily effected by conventional trimming dies.

In its operation, the plunger 16 is moved downwardly into the mold approximately one-half of the depth of the mold although the extent of this movement I have found varies somewhat depending upon the relationship of the diameter and the height of the mold.

What I claim is:

1. The method of forming liners from thin sheet plastic material for paper containers, the improvement consisting in positioning a heated sheet of the plastic material on the open end of the container, securing the marginal portion of the sheet against movement, engaging an annular area in the central portion of the sheet by a plunger, drawing the sheet partially into the container by the plunger and thereupon applying fluid pressure to the outer surface of the sheet in excess of the fluid pressure between the sheet and the inner surface of the container.

2. The method of forming liners from thin sheet plastic material for paper containers consisting in positioning a heated sheet of the plastic material on the open end of the container, securing the marginal portion of the sheet against movement, engaging an annular area of the sheet in the central portion thereof by a plunger, drawing the sheet partially into the container by the plunger and thereupon applying vacuum to the external surface of the container.

References Cited in the file of this patent

UNITED STATES PATENTS

| Number | Name | Date |
|---|---|---|
| 673,982 | Hamet | May 14, 1901 |
| 1,514,183 | Steele | Nov. 4, 1924 |
| 2,007,548 | Sampson | July 9, 1935 |
| 2,403,482 | Cloud | July 9, 1946 |
| 2,531,539 | Smith | Nov. 28, 1950 |